US010978685B2

United States Patent
Koch et al.

(10) Patent No.: US 10,978,685 B2
(45) Date of Patent: Apr. 13, 2021

(54) SEALING PLUG ARRANGEMENT, HOUSING AND ACCUMULATOR

(71) Applicant: Clarios Germany GmbH & Co. KGAA, Hannover (DE)

(72) Inventors: Ingo Koch, Hameln (DE); Armin Staffeldt, Lauenbruck (DE)

(73) Assignee: Clarios Germany GmbH & Co. KGAA, Hannover (DE)

( * ) Notice: Subject to any disclaimer, the term of this patent is extended or adjusted under 35 U.S.C. 154(b) by 0 days.

(21) Appl. No.: 14/894,021

(22) PCT Filed: May 28, 2014

(86) PCT No.: PCT/EP2014/061171
§ 371 (c)(1),
(2) Date: Dec. 18, 2015

(87) PCT Pub. No.: WO2014/191517
PCT Pub. Date: Dec. 4, 2014

(65) Prior Publication Data
US 2016/0126517 A1  May 5, 2016

(30) Foreign Application Priority Data

May 29, 2013 (DE) .................. 10 2013 105 511

(51) Int. Cl.
*H01M 2/12* (2006.01)
*F16K 15/14* (2006.01)
(Continued)

(52) U.S. Cl.
CPC ............. *H01M 2/12* (2013.01); *F16K 15/142* (2013.01); *H01M 2/1229* (2013.01);
(Continued)

(58) Field of Classification Search
CPC . Y10T 137/789; Y10T 137/7879; F16K 7/17; F16K 7/14; F16K 7/12;
(Continued)

(56) References Cited

U.S. PATENT DOCUMENTS 2,579,855 A * 12/1951 Pockel .................. F16K 15/148
137/854
2,690,466 A * 9/1954 Kendall .............. H01M 2/1205
429/53
(Continued)

FOREIGN PATENT DOCUMENTS

CN          2556794          6/2003
DE          1119351 B  * 12/1961  .......... H01M 2/1229
(Continued)

OTHER PUBLICATIONS

PCT/EP2014/061171 International Search Report and Written Opinion dated Oct. 9, 2014.
CN201480037449.3 First Office Action dated Jan. 25, 2017.

*Primary Examiner* — Hailey K. Do
(74) *Attorney, Agent, or Firm* — Boardman & Clark LLP

(57) ABSTRACT

A sealing plug arrangement for sealing a combined filling and degassing opening of an accumulator. The sealing plug arrangement includes at least one valve part, one valve holder, and one sealing plug. The valve part is arranged on the valve holder and forms an openable valve mechanism with the valve holder for sealing at least one interior space of the accumulator from the surrounding area upon pressurization. The sealing plug includes at least one fastening means for fixing to the filling and degassing opening and at the same time subjecting the valve part to a pretensioning force toward the valve holder. The valve holder includes at least one extension axially projecting toward the valve part (Continued)

Figure 1:
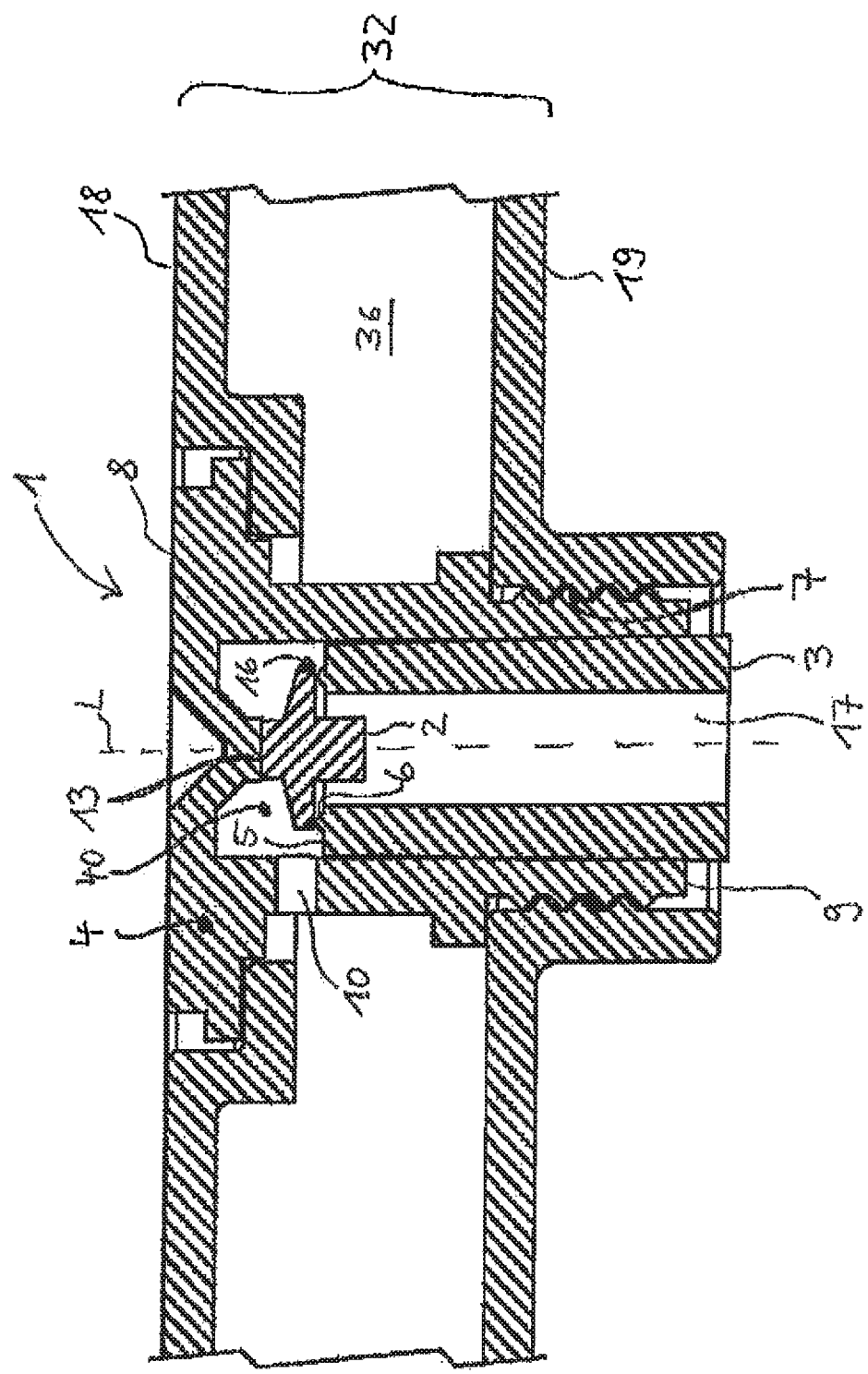

which is formed as a circumferential sealing edge on a surface facing the valve part on which the valve part rests.

12 Claims, 3 Drawing Sheets

(51) Int. Cl.
*H01M 10/06* (2006.01)
*H01M 2/36* (2006.01)

(52) U.S. Cl.
CPC ......... *H01M 2/1276* (2013.01); *H01M 2/362* (2013.01); *H01M 10/06* (2013.01); *Y10T 137/789* (2015.04)

(58) Field of Classification Search
CPC ...... F16K 15/148; F16K 15/14; F16K 15/141; F16K 15/142; F16K 7/20; F16K 17/003; F16K 17/0446; F16K 17/0453; F16K 17/0466; F16K 17/164; H01M 2/1229; H01M 2/1205

See application file for complete search history.

(56) References Cited

U.S. PATENT DOCUMENTS

| | | | | |
|---|---|---|---|---|
| 4,556,086 A * | 12/1985 | Raines | ................. | F16K 15/141 137/843 |
| 4,838,875 A * | 6/1989 | Somor | ................. | A61J 1/10 604/247 |
| 4,904,236 A * | 2/1990 | Redmond | ................. | A61M 27/006 137/854 |
| 5,258,243 A | 11/1993 | Cannone | | |
| 5,535,785 A * | 7/1996 | Werge | ................. | A61M 39/26 137/843 |
| 5,860,449 A * | 1/1999 | Schulte | ................. | F16K 15/148 137/512.15 |
| 5,996,631 A * | 12/1999 | Thronton | ................. | F16K 15/148 137/852 |
| 6,182,517 B1 * | 2/2001 | Zahner | ................. | B01L 3/0206 422/180 |
| 6,528,202 B1 | 3/2003 | Arai et al. | | |
| 7,350,541 B2 * | 4/2008 | Kobetsky | ................. | B65D 77/225 137/512.15 |
| 8,424,562 B2 * | 4/2013 | Berglund | ................. | F16K 15/144 137/512.15 |
| 8,528,773 B2 | 9/2013 | Streuer | | |
| 2008/0053546 A1 * | 3/2008 | Briggs | ................. | B60K 15/077 137/854 |
| 2011/0003184 A1 | 1/2011 | Koch | | |
| 2012/0177962 A1 * | 7/2012 | Streuer | ................. | H01M 2/1229 429/89 |

FOREIGN PATENT DOCUMENTS

| | | | | |
|---|---|---|---|---|
| DE | 102007061784 A1 * | 6/2009 | .......... | H01M 2/1205 |
| FR | 1498149 A * | 10/1967 | .......... | H01M 2/1223 |
| FR | 2725490 A3 * | 4/1996 | .............. | F16K 1/42 |
| GB | 2085217 A * | 4/1982 | .......... | H01M 2/1205 |

* cited by examiner

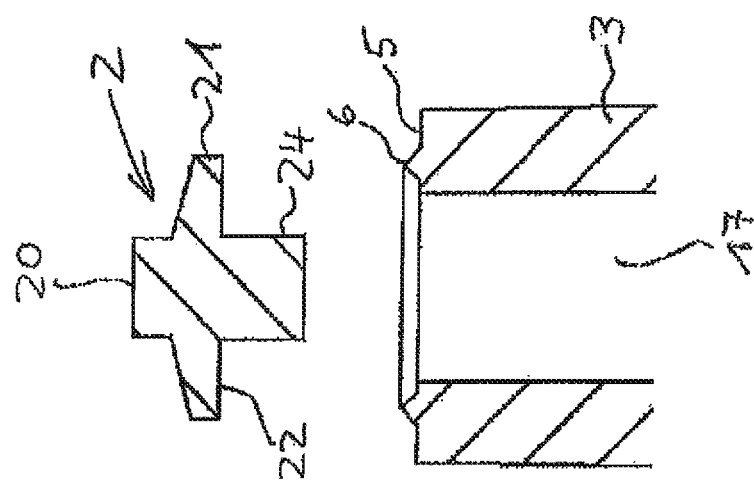

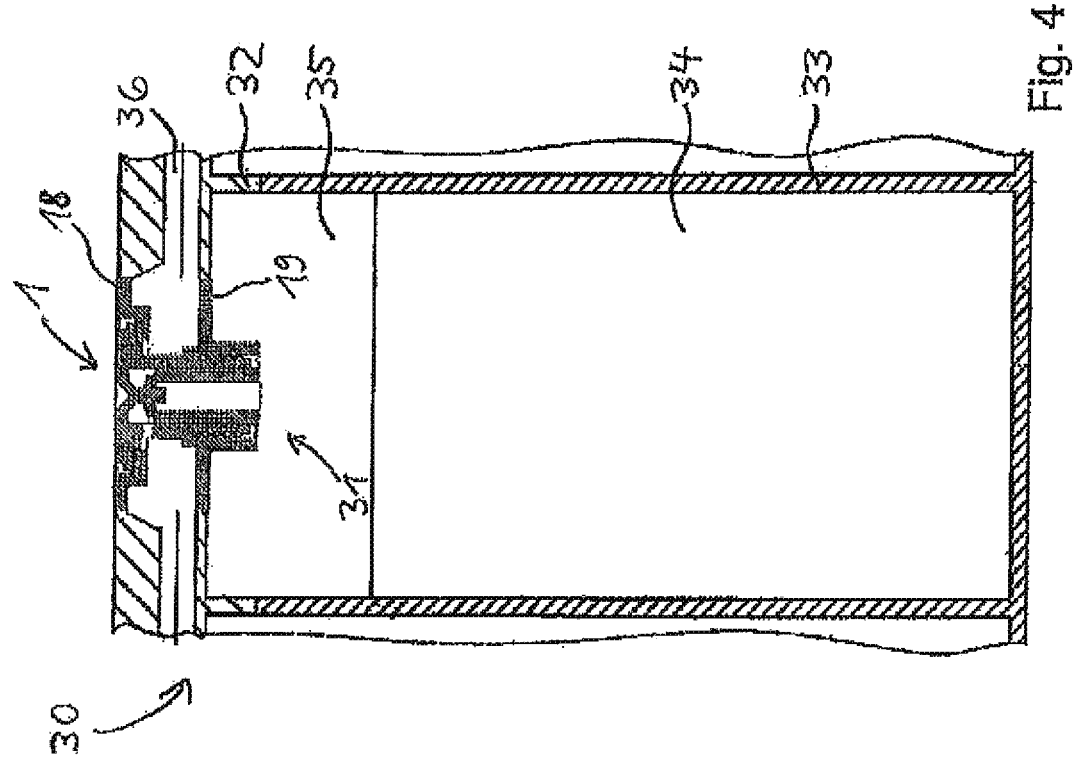
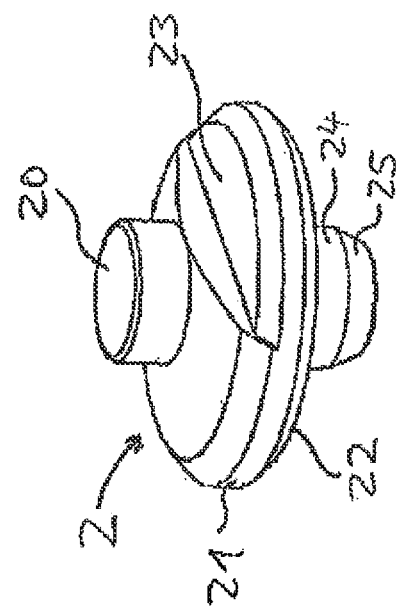

SEALING PLUG ARRANGEMENT, HOUSING AND ACCUMULATOR

The invention relates to a sealing plug arrangement for sealing a combined filling and degassing opening of an accumulator in accordance with the preamble of claim 1. The invention further relates to an accumulator housing in accordance with claim 9 as well as an accumulator according to claim 11.

In general, the invention relates to the field of electrochemical accumulators having liquid electrolytes, e.g. lead-acid batteries. The housing of the accumulator generally comprises a housing space partitioned into a plurality of chambers in which the liquid electrolyte is provided. Depending on the embodiment of the accumulator, the liquid electrolyte can be accommodated in a nonwoven material and thereby bound. To fill liquid electrolyte into the housing, at least one housing opening is provided as a filling opening. In normal accumulator operation, the filling opening must be able to be sealed so as to prevent undesired leakage of acid and maintain a certain—even if slight—excess pressure in the accumulator housing. To protect the accumulator against undesirably high excess pressure within the housing, it is advantageous to provide overpressure protection which allows the discharge of gas from the housing upon excessive pressure, e.g. via the filling opening, which then constitutes a combined filling and degassing opening.

In known accumulators, a sealing plug arrangement comprising at least one valve part, valve holder and sealing plug is provided to seal the combined filling and degassing opening. Correspondingly proposed arrangements are known from e.g. WO 2010/124684 A2, DE 10 2007 061 784 A1 and DE 10 2009 041 417 A1.

The invention is based on the task of specifying an improved sealing plug arrangement which is simpler to manufacture and yet highly reliable. A corresponding housing and corresponding accumulator are furthermore to be specified.

This task is solved according to claim 1 by a sealing plug arrangement for sealing a combined filling and degassing opening of an accumulator, wherein the sealing plug arrangement comprises at least one valve part, valve holder and sealing plug, whereby the valve part is arranged on the valve holder and forms an openable valve mechanism with the valve holder for sealing at least one interior space of the accumulator from the surrounding area upon pressurization, whereby the sealing plug comprises at least one fastening means for fixing to the filling and degassing opening and at the same time subjecting the valve part to a pretensioning force toward the valve holder, wherein the valve holder comprises at least one extension axially projecting toward the valve part which is formed as a circumferential sealing edge on a surface facing the valve part on which the valve part rests. The invention has the advantage that the sealing edge is configured as part of the valve holder and can thus be produced directly from the material of the valve holder. This allows a simple, economical manufacture of the sealing plug arrangement, as the production of the sealing edge can be directly integrated into the manufacturing process of the valve holder and no additional costs thereby occasioned. In consequence, the valve part can then be configured so as to have no axially projecting sealing lip in a contact region by which it rests on the valve holder. In particular, the valve part can be produced entirely without a projecting sealing lip. Doing so further simplifies the manufacture of the valve part. Since the valve part is frequently manufactured from a rubber-elastic material, this can reduce the manufacturing costs as the precise manufacturing of a sealing lip on a rubber-elastic component is costlier than on a component such as the valve holder which is frequently not made from a rubber-elastic material but rather from a harder material such as for example a plastic material, e.g. polypropylene.

The invention additionally reduces accumulator quality control and inspection costs since manufacturing the valve part from rubber-elastic material can reduce reject rates. The risk of defects is relatively high when manufacturing the valve part with an integrally molded sealing lip. As noted, doing away with a sealing lip integrally molded on the valve part reduces wastage.

Thus, the continuous operational stability of the accumulator can hereby also be improved, on the one hand by eliminating the risk of undetected defects in a sealing lip integrally formed on the valve part. The durability of the accumulator is thereby additionally increased by the sealing edge being able to be produced from the material of the valve holder, e.g. a harder plastic material. The operational life of the sealing edge and its sealing effect can thereby be increased compared to a rubber-elastic sealing lip on the valve part. The seal between the valve part and the valve holder is namely subject to corrosive acid from the accumulator, which can occur from two sides. Rubber-elastic materials are more susceptible to this than harder plastic materials.

The at least one fastening means of the sealing plug can be designed for example as an external thread which can be screwed into a corresponding internal thread of the filling and degassing opening. Different fastening means can also be provided, e.g. snap-fit fasteners or locking means such as e.g. engaging hooks.

The inventive sealing plug arrangement is particularly applicable to accumulators having a housing with the upper part of same comprising a block cover in which one or more degassing channel(s) is/are formed. The sealing plug arrangement is then advantageously sealed both vis-à-vis an upper section as well as a lower section of the block cover such that the degassing channel(s) between them is/are also sealed toward the top and bottom in the region of the sealing plug arrangement. The sealing of the sealing plug arrangement can be realized by the sealing plug having a respective sealing ring to effect sealing vis-à-vis the upper section and the lower section of the block cover. The respective sealing ring can be designed as a radial sealing ring or an axial sealing ring.

According to one advantageous further development of the invention, the sealing plug comprises at least one degassing opening in the axial region between the sealing vis-à-vis the upper section and the sealing vis-à-vis the lower section. The degassing opening of the sealing plug is then advantageously arranged so as to be in direct contact with a degassing channel formed in the block cover and allow a defined gas emission in the degassing channel via the degassing opening of the sealing plug by way of the valve mechanism.

One advantageous further development of the invention provides for the valve part not having an axially projecting sealing lip in the contact region bearing on the valve holder. According to one advantageous further development of the invention, the valve holder extension is formed from a harder material than the material of the valve part. In particular, the extension can be formed from the material of the valve holder, which can be produced from a plastic material, e.g. a hard plastic material such as polypropylene. The valve part can for example be made of rubber.

According to one advantageous further development of the invention, the valve part comprises an extension arranged in an inner cavity of the valve holder and functioning as a retaining section for holding the valve part in or on the valve holder. This allows a secure retaining of the valve part in the valve holder as well as a simple and reliable centering of the valve part vis-à-vis the valve holder.

According to one advantageous further development of the invention, the internal diameter of the valve holder is greater—at the least slightly greater—than the external diameter of the retaining section at least in the region of the inner cavity formed to receive the retaining section of the valve part. In so doing, the valve part is held in the valve holder with a certain degree of play, which enables a certain relative movement between the retaining section and the valve holder. When the interior of the accumulator is under high gas pressure, there is a certain compression of the upper region of the valve part; i.e. the valve part region outside of the hollow areas of the valve holder, such that the retaining section is slightly displaced upward relative to the valve holder. The play allows the valve part to expand again upon decreasing gas pressure and return to its original position, thereby enabling the valve part or the sealing bead respectively to again ensure a defined sealing.

According to one advantageous further development of the invention, the cross section of the valve holder's inner cavity axially tapers toward the valve part. The tapering region can in particular be of rotationally symmetrical design. The tapering region can in particular be arranged in the axial end region of the valve holder in which the valve part is arranged on said valve holder. This has the advantage of there being more bearing surface space for the valve part on an upper bearing surface of the valve holder than in known sealing plug arrangements. The lateral play of the valve part can moreover be reduced.

The valve holder can comprise rib-shaped projections on its inner circumference, between which are axially extending interstices. These interstices form flow channels for exiting gas. The rib-shaped projections can in particular be arranged in the valve holder's above-cited tapering interior region.

According to one advantageous further development of the invention, the valve part comprises a collar which forms a stop when the valve part is inserted into the valve holder. This advantageously allows easy insertion of the valve part into the valve holder, whereby the valve part can be accurately positioned with little effort. The collar can for example be arranged completely circumferentially around a central section of the valve part and thereby ensure sealing of the filling and degassing opening.

According to one advantageous further development of the invention, the valve part has an overpressure protection area comprising a cut-out on its far side from the valve holder. The cut-out weakens the material of the valve part in the region of the overpressure protection area, making it more easily deformable. This hereby ensures a defined opening of the valve mechanism at a predefined excess pressure. The cut-out can be advantageously produced directly during the manufacturing of the valve part by the appropriate shaping of the material, for example by applicably forming same during vulcanization. Alternatively, the cut-out can be realized by removing material from the valve part in a further process step, for example a cutting process. Providing the cut-out on the far side from the valve holder; i.e. the side not subject to the gas pressure, has the advantage of the shape and the size of the cut-out not affecting the flow cross section for exiting gas upon the overpressure protection being activated. The overpressure protection function can thereby be more easily and more selectively adapted to the existing requirements in terms of reaction pressure by the shape and size of the cut-out.

According to one advantageous further development of the invention, the cut-out has a substantially linear or partially circular contour when the valve part is viewed from above. This allows the cut-out to be easily produced.

According to one advantageous further development of the invention, the valve part comprises a position of increased flexibility in the region of the overpressure protection area. Depending on the embodiment of the valve part, the position of increased flexibility can be provided additionally or alternatively to the above-described cut-out. The position of increased flexibility allows for precisely stipulating the overpressure protection function parameters according to need, such as for example the opening pressure or the opening cross section of the valve mechanism as a function of the excess pressure.

The position of increased flexibility can for example be realized by providing for a weakening of the valve part material.

According to one advantageous further development of the invention, the valve part is composed entirely or partially of rubber-elastic material. Rubber-elastic material is thereby advantageously used particularly in the overpressure protection area. By so doing, the overpressure protection can be produced with little effort, in particular without additional joints or hinges.

According to one advantageous further development of the invention, the sealing plug comprises an inner chamber for receiving the valve part and the valve holder. This has the advantage of the valve holder being able to be held and supported over a relatively large distance by the tubular extension. This allows the realizing of a sturdy mechanical fixing of the valve holder on the sealing plug.

According to one advantageous further development of the invention, the sealing plug comprises a wall on its end region opposite the arrangement of valve part and valve holder which seals the interior of the accumulator from the surrounding area when the sealing plug arrangement is inserted into the filling and degassing opening, if applicable with the addition of a seal. This has the advantage of the sealing plug being able to completely seal the exterior of the accumulator housing such that neither liquid electrolyte nor any developing gas can directly escape into the surrounding area through the filling and degassing openings. Gas can at the most be routed through a degassing channel to a defined location in the housing at which a gas outlet opening is provided, same as a rule being provided with backfire protection. Gas cannot, however, directly escape into the atmosphere from the individual filling and degassing openings.

The above-cited wall has even further substantial functions in addition to the above-described sealing function. The wall serves to absorb torque via a driver profile upon the fixing of the sealing plug arrangement in the filling and degassing opening and to absorb forces so as to provide a counterforce to the fixing force of the fixing thread.

The task cited at the outset is further solved pursuant to claim 9 by a housing of an accumulator having a box-shaped lower housing part and an upper housing part serving as a cover for the housing which can be or is set onto the lower housing part, whereby the upper housing part comprises at least one combined filling and degassing opening of the accumulator sealed by a sealing plug arrangement of the type described above.

According to one advantageous further development of the invention, the upper housing part comprises at least one degassing channel extending within the upper housing part to at least one gas outlet opening of the housing, wherein the gas outlet opening is spaced at a distance from the combined filling and degassing opening.

The task cited at the outset is further solved pursuant to claim 11 by an accumulator having a housing of the above-specified type.

The following will reference the drawings in using example embodiments to describe the invention in greater detail.

Shown are:

FIG. 1 a side sectional view of a sealing plug arrangement inserted into an upper housing part of an accumulator housing;

FIG. 2 a side sectional view of a valve holder and a valve part;

FIG. 3 an isometric representation of a valve part; and

FIG. 4 a side sectional view of part of an accumulator.

The figures use the same reference numerals for comparable elements.

FIG. 1 shows a sealing plug arrangement 1 in a side sectional view. A valve part 2, valve holder 3 and sealing plug 4 can be recognized. The valve holder 3 is of substantially tubular design, e.g. having a circular ring-shaped cross section, and comprises an inner cavity 17 in which a retaining section of the valve part 2 is arranged. Together with an extension 6 arranged on an upper side 5 of the valve holder 3, the valve part 2 forms a valve mechanism 16 which opens as of a certain excess pressure in the cavity 17. The cavity 17 is connected to the interior of the accumulator when a sealing plug arrangement is inserted into a filling and degassing opening of the accumulator.

At its upper side, the sealing plug 4 has a wall 8 directed toward the exterior of the accumulator which is fully liquid/gas-tight. The sealing plug 4 further comprises an axially extending tubular extension 9 at its opposite side from wall 8 facing the interior of the battery. The tubular extension 9 serves to receive and secure the valve holder 3 inserted into an inner chamber 40 of the tubular extension 9.

The wall 8 comprises a driver profile by means of which the sealing plug arrangement 1 can be screwed into the thread of the filling and degassing opening. The wall 8 then rests on the upper cover 18 and absorbs the fixing force produced by the thread. The wall 8 moreover seals the interior of the accumulator from the surrounding area. To this end, one or more seals can be provided between the wall 8 and the upper cover 18, e.g. in the form of sealing rings, which are molded onto or beneath the head of the sealing plug 4 forming the wall.

FIG. 1 further shows that the sealing plug arrangement 1 is inserted into an upper housing part 32 of an accumulator configured as a block cover. The upper housing part 32 comprises an upper section 18 and a lower section 19 connected together into the cited block cover. One or more degassing channel(s) 36 is/are formed between the upper section 18 and the lower section 19, via which the gas developing in the accumulator can enter into a gas outlet opening of the accumulator housing. The sealing plug arrangement 1, or its sealing plugs 4 respectively, comprises a degassing opening 10 connected to degassing channel 36. Gases can escape through the valve mechanism 16 via cavity 17 upon the corresponding excess pressure inside the accumulator and then reach the degassing opening 10, from where they can be discharged via the degassing channels 36.

As fastening means to enable fixing to the upper housing part 32, the sealing plug 4 comprises an external thread 7 able to be screwed into a corresponding internal thread of the upper housing part 32, e.g. in lower section 19.

The sealing plug 4 comprises a valve pressurization surface 13 as a further element which can for example be arranged on an inner extension as shown in FIG. 1. The valve pressurization surface 13 serves to subject an upper surface of a pressurizing extension 20 of the valve part 2 contacting the valve pressurization surface 13 to a certain pretensioning force relative to the valve holder 3 so that the valve mechanism 16 will not open until a certain minimum pressure above atmospheric pressure is reached.

As can be seen in FIG. 1, the valve holder 3 exhibits the extension 6 on its axial side 5 directed toward the valve part 2. The extension 6 is configured as a circumferential sealing edge about axial region 5, as becomes particularly clear in FIG. 2, It can be seen in FIG. 1 that the valve part 2 rests on the extension 6 by the lower surface 22 of a collar 21 and thereby forms a seal and at the same time the valve mechanism 16.

FIG. 2 shows part of the upper part of the valve holder 3 as well as valve part 2 prior to being brought into contact with the valve holder 3.

FIG. 3 further shows an example of a valve part 1 in an enlarged isometric representation. It can be seen that the valve part 1 comprises an e.g. cylindrical pressurizing extension 20 on its side facing the valve pressurization surface 13 of the sealing plug 4. An area of larger cross section designated as collar 21 attaches to same. The collar 21 has no sealing lip at its lower surface 22. Valve part 1 exhibits a retaining section 24 beneath the collar 21 which, as FIG. 1 shows, is disposed in the valve holder 3. The retaining section 24 can be of cylindrical configuration transitioning into a conical section 25 toward the lower end of the valve part 1. The conical section 25 serves as a lead-in chamfer and facilitates the inserting of the valve part 1 into the hollow region 17 of the valve holder 3.

In order to realize a valve function having a defined pressure response threshold, valve part 1 can exhibit a cut-out 23 on the upper side of the collar 21. The cut-out 23 reduces the material thickness of the collar 21 in this region so as to yield a position of increased flexibility. In consequence thereof, developing gas pressure can more easily deform the collar 21 in the region of the cut-out 23 than in the remaining sections of the collar 21.

FIG. 4 shows a side sectional view of part of an accumulator 30 having a housing comprising an upper housing part 32 and a lower housing part 33. The detail as depicted shows one rechargeable battery cell. The battery cell comprises a housing chamber 34, 35 which serves to accommodate liquid electrolyte. A gas compartment 35 is provided in the upper region of the housing chamber 34, 35, the liquid electrolyte being disposed in the lower region 34. A combined filling and degassing opening 31 is provided in the upper housing part 32 into which a sealing plug arrangement 1 of the type described above is inserted. The external thread 7 screws the sealing plug arrangement 1 into a corresponding internal thread of the filling and degassing opening 31. When gas builds up in the gas compartment 35 and exceeds a certain excess pressure, valve mechanism 16 opens. Excess gas can thereby enter into a degassing channel 36 formed in upper housing part 32 via the internal cavity 17, the valve mechanism 16 and the degassing opening 10 of the sealing plug 4. The degassing channel 36 is connected to a gas outlet opening of the housing 32, 33 which in turn connects to the surrounding area.

The invention claimed is:

1. A sealing plug arrangement for sealing a combined filling and degassing opening of an accumulator, wherein the sealing plug arrangement comprises: a valve part, a valve holder, and a sealing plug, wherein the valve part is arranged on the valve holder and forms an openable valve mechanism with the valve holder configured to seal at least one interior space of the accumulator from a surrounding area upon pressurization, wherein the sealing plug comprises at least one fastener configured to fix to a filling and degassing opening and at the same time to subject the valve part to a pretensioning force toward the valve holder, wherein the valve holder comprises at least one extension axially projecting toward the valve part which is formed as a circumferential sealing edge on an upper surface facing the valve part on which the valve part rests, wherein the at least one extension comprises a tapered surface that axially tapers from the upper side of the valve holder toward the valve part, the valve part comprising a retaining section, wherein the retaining section of the valve part extends into an inner cavity of the valve holder, wherein the valve part includes a sealing section extending radially outward from the retaining section to a distal end of the sealing section, wherein a surface of the sealing section is planar and configured to abut the circumferential sealing edge of the valve holder, wherein the inner cavity of the valve holder is configured to at least partially block lateral movement of the valve part with respect to the valve holder, wherein the inner cavity comprises a first diameter at a first end of the inner cavity and a second diameter at a second end of the inner cavity, distal to the first end, and the inner cavity has a constant taper between the first end and the second end of the inner cavity of the valve holder, and according to which the circumferential sealing edge comprises a diameter greater than the diameter of the inner cavity, and wherein the at least one extension is formed from a harder material than a material of the valve part.

2. The sealing plug arrangement according to claim 1, wherein the valve part has no axially projecting sealing lip on the sealing section by which the valve part rests on the valve holder.

3. The sealing plug arrangement according to claim 1, wherein the sealing plug comprises an inner chamber for receiving the valve part and the valve holder.

4. The sealing plug arrangement according to claim 1, wherein the sealing plug comprises a wall on an end region of the sealing plug opposite the arrangement of the valve part and the valve holder which seals the at least one interior space of the accumulator from the surrounding area when the sealing plug arrangement is inserted into the filling and degassing opening.

5. The sealing plug arrangement of claim 1, wherein the at least one extension comprises polypropylene.

6. The sealing plug arrangement of claim 1, wherein the tapered surface of the at least one extension forms a tapered cavity having an additional diameter that is greater than the diameter of the inner cavity.

7. The sealing plug arrangement of claim 1, wherein the at least one extension has across-section that is conical.

8. A housing of the accumulator, the housing having a box-shaped lower housing part and an upper housing part serving as a cover for the housing configured to be set onto the lower housing part, wherein the upper housing part comprises the filling and degassing opening of the accumulator sealed by the sealing plug arrangement of claim 1.

9. An accumulator having a housing according to claim 8.

10. The sealing plug arrangement according to claim 1, wherein the retaining section of the valve part is configured to hold the valve part in or on the valve holder.

11. The sealing plug arrangement according to claim 10, wherein an internal diameter of the valve holder is greater than an external diameter of the retaining section at least in a hollow region formed to receive the retaining section of the valve part.

12. The sealing plug arrangement according to claim 10, wherein the sealing section of the valve part forms a stop when the valve part is inserted into the valve holder.

* * * * *